US012371121B1

(12) United States Patent
Davies et al.

(10) Patent No.: US 12,371,121 B1
(45) Date of Patent: Jul. 29, 2025

(54) CARGO DELIVERY VEHICLE WITH ENHANCED CENTER OF GRAVITY (71) Applicant: American Honda Motor Co., Inc., Torrance, CA (US)

(72) Inventors: Jamie Davies, Huntington Beach, CA (US); Devon J Fujioka, Los Angeles, CA (US)

(73) Assignee: American Honda Motor Co., Inc., Torrance, CA (US)

( * ) Notice: Subject to any disclaimer, the term of this patent is extended or adjusted under 35 U.S.C. 154(b) by 0 days.

(21) Appl. No.: 18/678,863

(22) Filed: May 30, 2024

(51) Int. Cl.
*B62K 7/02* (2006.01)
*B60K 1/04* (2019.01)
(Continued)

(52) U.S. Cl.
CPC .............. *B62K 7/02* (2013.01); *B60K 1/04* (2013.01); *B62D 61/065* (2013.01); *B62J 43/13* (2020.02); *B62J 43/20* (2020.02); *B62K 5/027* (2013.01); *B62K 5/05* (2013.01); *B62K 5/06* (2013.01); *B62K 5/08* (2013.01); *B62K 7/04* (2013.01); *B62K 13/06* (2013.01); *B62M 6/50* (2013.01);
(Continued)

(58) Field of Classification Search
CPC ... B62K 7/02; B62K 7/04; B62K 7/00; B62K 5/027; B62K 5/05; B62K 5/08; B62K 5/00; B62K 5/06; B62K 5/02; B62K 13/06; B62K 2005/001; B62K 2204/00; B62J 43/13; B62J 43/20; B62D 61/065; B62D 61/06; B60G 2300/122; B60G 2300/13; B60G 2300/50; B60L 50/00; B60L 50/50; B60L 50/60; B60L 50/66; B62M 6/00; B62M 6/40; B62M 6/80; B62M 6/90; B62M 6/45; B62M 6/50; B60Y 2200/12; B60Y 2200/112; B60Y 2200/122; B60Y 2200/91; B60K 1/04
USPC ....... 180/210, 211, 212, 213, 214, 215, 216, 180/217; 280/62
See application file for complete search history.

(56) References Cited

U.S. PATENT DOCUMENTS 4,070,032 A * 1/1978 Cunningham ........... B62K 3/12
280/231
4,227,589 A * 10/1980 Chika ...................... B62M 6/10
280/283
(Continued)

FOREIGN PATENT DOCUMENTS

CN 102348596 A * 2/2012 ............. B62K 5/007
CN 107953958 A * 4/2018 ................ B62J 1/16
(Continued)

*Primary Examiner* — Keith J Frisby
(74) *Attorney, Agent, or Firm* — Joslyn Garcia; American Honda Motor Co., Inc.

(57) ABSTRACT

A vehicle is provided. The vehicle includes a wheel arrangement having a pair of front wheels and a back wheel configuration. The vehicle further includes a frame that is coupled to the wheel arrangement and a steering assembly mounted at a front portion of the frame. The vehicle further includes a battery unit that is disposed on a support portion of the frame and a pedal unit that is mounted at a middle portion of the frame. The vehicle further includes a rear carrier that is proximal to the back wheel configuration and configured to support a cargo container. The vehicle further includes a rear suspension that is mounted on a rear portion of the frame in proximity to the back wheel configuration.

20 Claims, 4 Drawing Sheets

(51) Int. Cl.
  *B60L 50/60*   (2019.01)
  *B62D 61/06*   (2006.01)
  *B62J 43/13*   (2020.01)
  *B62J 43/20*   (2020.01)
  *B62K 5/027*   (2013.01)
  *B62K 5/05*    (2013.01)
  *B62K 5/06*    (2006.01)
  *B62K 5/08*    (2006.01)
  *B62K 7/04*    (2006.01)
  *B62K 13/06*   (2006.01)
  *B62M 6/50*    (2010.01)
  *B62M 6/90*    (2010.01)
  *B62K 5/00*    (2013.01)

(52) U.S. Cl.
  CPC ......... *B62M 6/90* (2013.01); *B60G 2300/122* (2013.01); *B60G 2300/13* (2013.01); *B60G 2300/50* (2013.01); *B60Y 2200/122* (2013.01); *B60Y 2200/91* (2013.01); *B62K 2005/001* (2013.01); *B62K 2204/00* (2013.01)

(56) References Cited

U.S. PATENT DOCUMENTS

| | | | | |
|---|---|---|---|---|
| 4,606,429 A | * | 8/1986 | Kurata | B62D 61/065 |
| | | | | 180/382 |
| 5,036,937 A | * | 8/1991 | Tanaka | B62M 6/10 |
| | | | | 280/214 |
| D639,711 S | * | 6/2011 | Chartrand | D12/107 |
| 8,632,088 B2 | * | 1/2014 | Yerdon | B60T 7/045 |
| | | | | 280/221 |
| 8,640,796 B2 | * | 2/2014 | Wilson | B60L 7/10 |
| | | | | 280/231 |
| 8,727,057 B2 | | 5/2014 | Park et al. | |
| 8,857,551 B2 | | 10/2014 | Lee et al. | |
| D753,021 S | * | 4/2016 | Allen | D12/16 |
| 11,312,443 B2 | | 4/2022 | Gomez Marquez | |
| 2005/0093270 A1 | * | 5/2005 | Wilcox | B62K 5/05 |
| | | | | 280/282 |
| 2005/0236803 A1 | * | 10/2005 | Summers | B62K 5/05 |
| | | | | 280/282 |
| 2008/0115988 A1 | * | 5/2008 | Holland | B60L 50/20 |
| | | | | 180/65.6 |
| 2009/0278330 A1 | * | 11/2009 | Hartmann | B62M 1/30 |
| | | | | 475/170 |
| 2010/0072726 A1 | * | 3/2010 | Madsen | B62H 1/04 |
| | | | | 280/281.1 |
| 2015/0175184 A1 | * | 6/2015 | Yadan | B62K 5/05 |
| | | | | 280/35 |
| 2019/0016405 A1 | * | 1/2019 | Huang | B62K 5/10 |
| 2021/0284203 A1 | * | 9/2021 | Hart | B61D 15/10 |
| 2023/0356799 A1 | * | 11/2023 | Bazak, Sr. | B62K 5/08 |

FOREIGN PATENT DOCUMENTS

| | | | | |
|---|---|---|---|---|
| CN | 110884600 A | * | 3/2020 | |
| CN | 213566289 U | | 6/2021 | |
| CN | 113286740 A | * | 8/2021 | ........... B62K 15/008 |
| CN | 214451542 U | | 10/2021 | |
| CN | 114802565 A | | 7/2022 | |
| DE | 202008012695 U1 | | 6/2009 | |
| DE | 102019126096 A1 | * | 11/2019 | |
| DE | 102021004030 A1 | * | 2/2023 | |
| EP | 3380393 B1 | * | 2/2020 | ............. B62K 25/04 |
| EP | 4177142 A1 | | 5/2023 | |
| IN | 202141010199 A | | 9/2022 | |
| JP | 6574408 B2 | | 9/2019 | |
| WO | 2011132185 A1 | | 10/2011 | |
| WO | WO-2018138594 A1 | * | 8/2018 | ............. B60B 37/08 |
| WO | WO-2022234477 A1 | * | 11/2022 | ............. B62K 19/16 |
| WO | 2023182703 A1 | | 9/2023 | |

\* cited by examiner

CARGO DELIVERY VEHICLE WITH ENHANCED CENTER OF GRAVITY

BACKGROUND

A last-mile delivery cargo vehicle is designed to transport goods from a distribution hub to the final delivery destination. This last-mile delivery is a critical component in the supply chain, especially in urban environments where there is a high demand for timely and efficient delivery services. Traditional cargo vehicles often face several challenges when utilized for last-mile deliveries. One of the primary issues is the center of gravity of these vehicles. Conventional cargo vehicles are susceptible to tipping or overturning around corners and turns, particularly in narrow city streets, which can result in damage to both the vehicle and the cargo. Furthermore, these vehicles can be difficult to navigate through congested areas, leading to increased delivery times. They also typically have larger turning radii, making it difficult to navigate sharp turns or corners. This becomes a significant problem when maneuvering the vehicles in narrow lanes where space is limited. As such, there is a need for a more efficient and agile vehicle design for last-mile delivery. This need could potentially be met through the use of modular vehicles, which can be tailored to improve the vehicle's center of gravity, enhancing maneuverability in urban settings.

Limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, a vehicle is provided. The vehicle may include a wheel arrangement having a pair of front wheels and a back wheel configuration. The vehicle may further include a frame that may be coupled to the wheel arrangement. The vehicle may further include a steering assembly that may be mounted on a front portion of the frame. The vehicle may further include a battery unit that may be disposed on a support portion of the frame. The vehicle may further include a pedal unit that may be mounted at a middle portion of the frame. The vehicle may further include a rear carrier that is proximal to the back wheel configuration. The rear carrier may be configured to support a cargo container. The vehicle may further include a rear suspension that may be mounted on a rear portion of the frame in proximity to the back wheel configuration.

According to another embodiment of the disclosure, a vehicle is provided. The vehicle may include a wheel arrangement having a pair of front wheels and a back wheel configuration. The vehicle may further include a frame that may be coupled to the wheel arrangement. The vehicle may further include a steering assembly that may be mounted on a front portion of the frame. The vehicle may further include a battery unit that may be disposed on a support portion of the frame. The vehicle may further include a pedal unit that may be mounted at a middle portion of the frame. The vehicle may further include a rear carrier that is proximal to the back wheel configuration. The rear carrier may be configured to support a cargo container. The vehicle may further include a rear suspension that may be mounted on a rear portion of the frame in proximity to the back wheel configuration. The vehicle may further include a rotational device that may be coupled to wheels included in the back wheel configuration and an electronic controller that may be communicatively coupled to the rotational device. In an operational state, the electronic controller may be configured to control actuation of the rotational device to drive the wheels included in the back wheel configuration.

According to another embodiment of the disclosure, a method of assembling a vehicle is provided. The method may include coupling a wheel arrangement with the vehicle. The wheel arrangement may include a pair of front wheels and a back wheel configuration. The method may further include coupling a frame with the wheel arrangement and mounting a steering assembly on a front portion of the frame. The method may further include disposing a battery unit on a support portion of the frame. The method may further include mounting a pedal unit at a middle portion of the frame. The method may further include mounting a rear carrier in proximity to the back wheel configuration. The rear carrier may be configured to support a cargo container. The method may further include mounting a rear suspension on a rear portion of the frame in proximity to the back wheel configuration.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in a vehicle. The disclosed vehicle may include a wheel arrangement having a pair of front wheels and a back wheel configuration. The disclosed vehicle may further include a frame that may be coupled to the wheel arrangement, a steering assembly that may be mounted on a front portion of the frame, and a battery unit that may be disposed on a support portion of the frame. The disclosed vehicle may further include a pedal unit that may be mounted at a middle portion of the frame and a rear carrier that is proximal to the back wheel configuration. The rear carrier may be configured to support a cargo container. The disclosed vehicle may further include a rear suspension that may be mounted on a rear portion of the frame in proximity to the back wheel configuration.

Traditionally, cargo vehicles have a number of limitations. For example, cargo vehicles have higher center of gravity, which may overturn or tip up the vehicles around corners and turns, resulting in physical damage being caused to the vehicles and cargo. Moreover, such cargo vehicles have larger turning radii, making it challenging to turn around corners or sharp turns, which reduces maneuverability of vehicles in narrow lanes of urban areas.

To overcome some of the abovementioned limitations, the vehicle may include a back wheel configuration. The wheels included in the back wheel configuration may be diametrically smaller than the pair of front wheels, which may lower the center of gravity of the rear portion of the frame, resulting in better stability around the concerns or turns. The lower center of gravity of the rear portion of the frame may reduce the turning radii, which assists a rider or user in turning the vehicle in narrow lanes of urban areas.

Reference will now be made in detail to specific aspects or features, examples of which are illustrated in the accompanying drawings. Wherever possible, corresponding, or similar reference numbers will be used throughout the drawings to refer to the same or corresponding parts.

Figure 1:
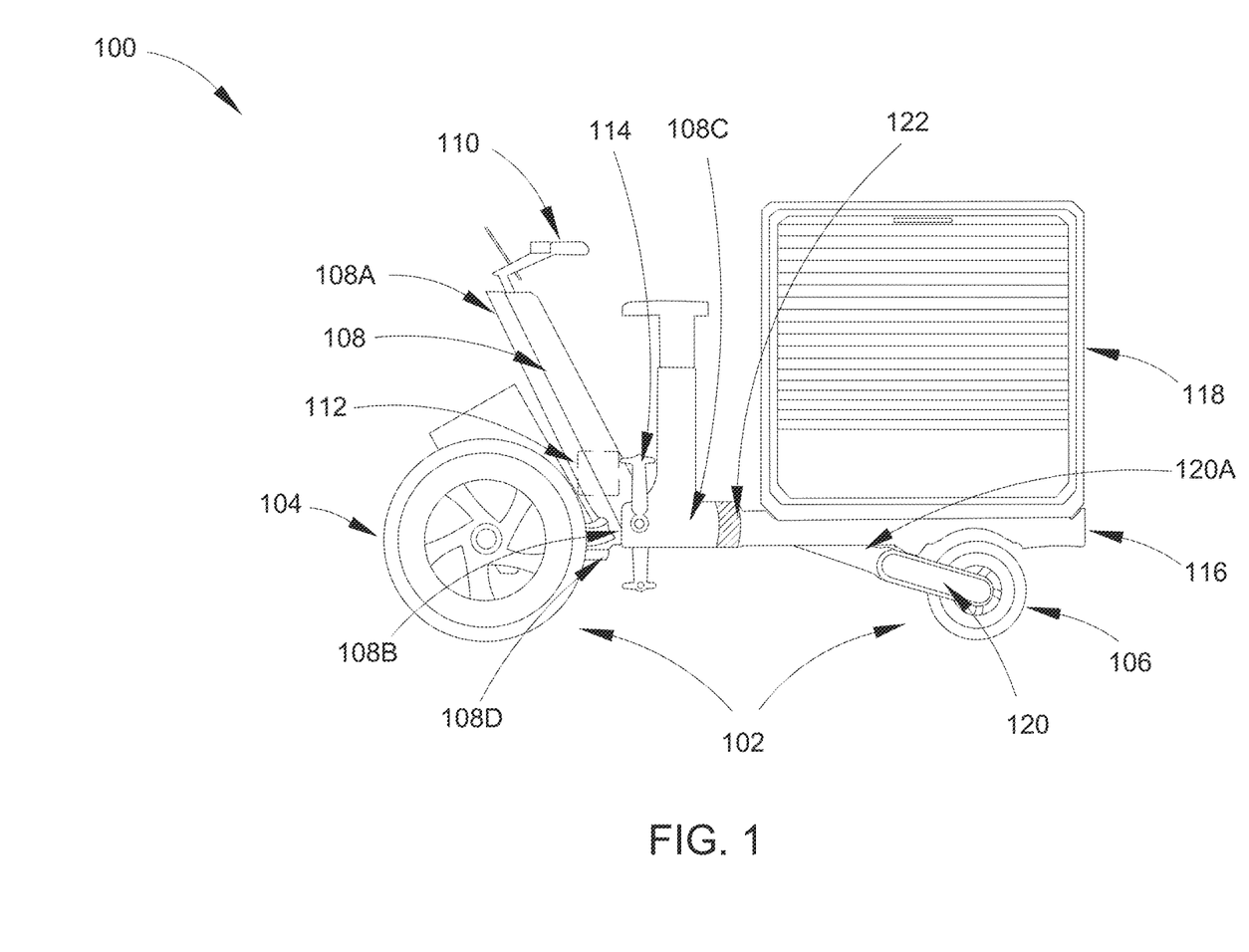
FIG. 1 is a diagram that illustrates an exemplary vehicle, in accordance with an embodiment of the disclosure.

FIG. 1 is a diagram that illustrates an exemplary vehicle, in accordance with an embodiment of the disclosure. With reference to the FIG. 1, there is shown a diagram of a vehicle 100. The vehicle 100 may include a wheel arrangement 102, a pair of front wheels 104, and a back wheel configuration 106. The vehicle 100 may further include a frame 108 having a front portion 108A, a middle portion 108B, a rear portion 108C, and a support portion 108D. The vehicle 100 may further include a steering assembly 110, a battery unit 112 (i.e., a see-through view of the battery unit 112), a pedal unit 114, a rear carrier 116, a cargo container 118, a rear suspension 120 having a hydraulic lever 120A, and a rotational device 122.

The vehicle 100 with at least two wheels may be a means of transport, which may be operated by a rider or user at speeds (for example, speed range of 15 km/h to 25 km/h) that may be suitable for micro-mobility or last mile delivery. The vehicle 100 may be categorized as a micromobility vehicle based on a speed of the vehicle 100, a cargo carrying capability, or a mileage of the vehicle 100. Examples of the vehicle 100 may include, but are not limited to, a bicycle, an e-bike, an electric scooter, or an electric pedal assisted bicycle. Such vehicles may be human-powered, or battery powered. The vehicle 100 in FIG. 1 is an electric pedal assisted vehicle, which is merely an example that should not be construed as limiting the disclosure. The present disclosure may be applicable to other types of vehicles (for example, tricycles, quadracycles, foldable bikes, and the like). The description of such types of the vehicle 100 has been omitted from the disclosure for the sake of brevity.

The wheel arrangement 102 may be an arrangement of wheels of the vehicle 100 and may include the pair of front wheels 104 and the back wheel configuration 106. The wheel arrangement 102 may be an assembly of the wheels across the frame 108 of the vehicle 100 based on a type of the vehicle 100 and a connection or position of the wheels across the frame 108.

Figure 2A:
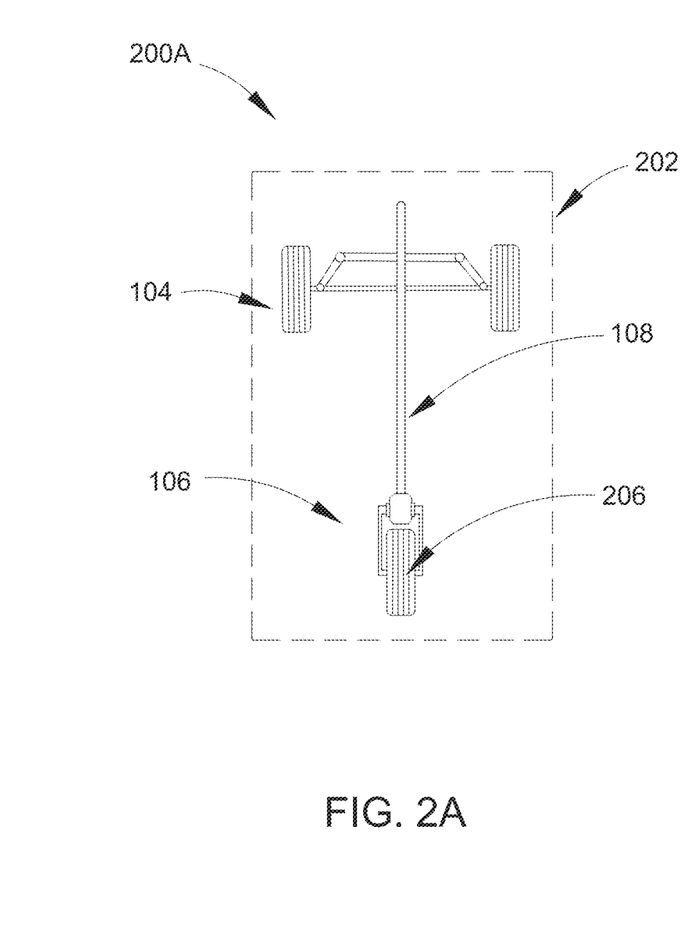
FIG. 2A is a scenario diagram that illustrates a bottom view of a wheel arrangement of the vehicle of FIG. 1, in accordance with an embodiment of the disclosure.

In accordance with an embodiment, the wheel arrangement 102 may provide a plurality of layouts for the vehicle 100 that may be adopted based on a number of wheels in the wheel arrangement 102. For example, the wheel arrangement 102 may correspond to one of a three-wheel arrangement or a four-wheel arrangement. The three-wheel arrangement may include the pair of front wheels 104 and a rear wheel (for example, a rear wheel 206 as shown in FIG. 2A) in the back wheel configuration 106. The four-wheel arrangement may include the pair of front wheels 104 and a pair of rear wheels (for example, a pair of rear wheels 208 as shown in FIG. 2B) in the back wheel configuration 106.

The pair of front wheels 104 may provide at least a forward or reverse movement to the vehicle 100. The pair of front wheels 104 are further illustrated in detail, for example in FIG. 2A and FIG. 2B. The pair of front wheels 104 may be coupled at a front portion 108A of the frame 108. As an example, the pair of front wheels 104 may receive a propulsion force in at least a forward or reverse direction from pedals of the vehicle 100. As another example, the pair of front wheels 104 may receive a propulsion force in at least a forward or reverse direction from a powertrain system of the vehicle 100 to move the vehicle 100 in the forward or reverse direction.

Figure 2B:
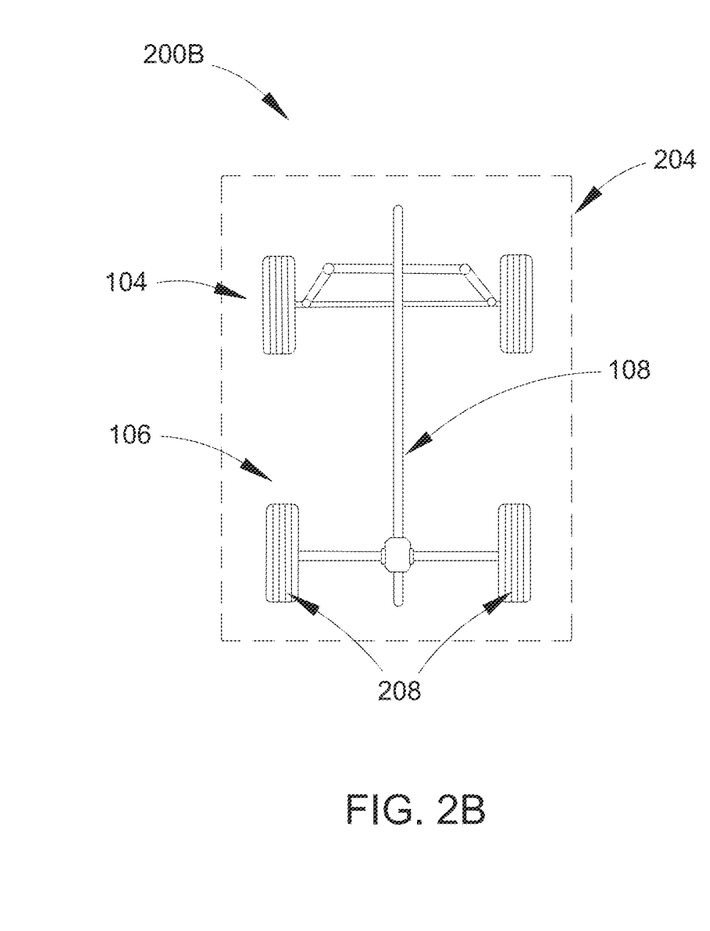
FIG. 2B is another scenario diagram that illustrates a bottom view of a wheel arrangement of the vehicle of FIG. 1, in accordance with an embodiment of the disclosure.

The back wheel configuration 106 may provide at least a forward or reverse movement to the vehicle 100 using at least one of a rear wheel or a pair of rear wheels, as described in detail, for example in FIG. 2A and FIG. 2B. The back wheel configuration 106 may be coupled at a rear portion 108C of the frame 108. Further, wheels included in the back wheel configuration 106 may be diametrically smaller than the pair of front wheels 104. Such wheels in the back wheel configuration 106 may be configured to provide a low center of gravity to the rear portion 108C of the frame 108. The low center of gravity of the rear portion 108C of the frame 108 may help to distribute weight of the cargo container 118 closer to a ground surface or road and may alleviate chances of overturning or unbalancing of the vehicle 100. Additionally, a low center of gravity of the rear portion 108C of the frame 108 may reduce a turning radius of the vehicle 100, which may assist the rider or user in turning the vehicle 100 in narrow lanes of urban areas.

The frame 108 of the vehicle 100 may be a main support structure of the vehicle 100 which may be configured to bear stresses induced on the vehicle 100. Additionally, the frame 108 may be a load-bearing framework of the vehicle 100, which may structurally support a plurality of vehicle systems, such as, but not limited to, a transmission system, a brake system, a suspension system, at least one seat, or a steering assembly. For example, the frame 108 for a two-wheeler may include a plurality of components, such as, but not limited to, suspensions, wheels, a fuel tank, a battery, at least one seat, or a handlebar. As another example, the frame 108 for a three-wheeler or a four-wheeler may include components, such as suspensions, wheels, a fuel tank, a battery, at least one seat, a cabin, at least one of a handlebar or a steering wheel. The present disclosure may be applicable to the frame 108 of other types of vehicle (for example, an electric scooter, an electric skateboard, a shared bicycle, and the like). The description of the frame 108 of such types of the vehicles has been omitted from the disclosure for the sake of brevity.

The frame 108 may include the front portion 108A which may substantially face towards a direction of movement of the vehicle 100. For example, the front portion 108A may be at an angle with a horizontal plane. A cross section of the front portion 108A of the frame 108 may have a substantially rectangular shape. Alternatively, the cross section of the front portion 108A of the frame 108 may be formed to have another shape (for example, a substantially square shape, a substantially circular shape, a substantially semi-circular shape, and the like), without a departure from the scope of the present disclosure.

The frame 108 may further include the middle portion 108B that may be located between the front portion 108A of the frame and the rear portion 108C of the frame 108. The middle portion 108B may be at an angle with the front portion 108A. Additionally, or alternatively, the middle portion 108B may have an inverted "T" shape as shown in FIG. 1. A cross section of the middle portion 108B of the frame 108 may have a substantially circular shape. Alternatively, the cross-section of the middle portion 108B of the frame 108 may be formed to have another shape (for example, a substantially square shape, a substantially rectangular shape, a substantially semi-circular shape, and the like), without a departure from the scope of the present disclosure.

The frame 108 may further include the rear portion 108C which may substantially face against a direction of movement of the vehicle 100. The rear portion 108C may be at an angle with the front portion 108A. Additionally, the rear portion 108C may be an extension that may extend substantially horizontally to the middle portion 108B. For example, the rear portion 108C may be substantially parallel to a horizontal plane. A cross section of the rear portion 108C of the frame 108 may have a substantially rectangular shape. Alternatively, the cross section of the rear portion 108C of the frame 108 may be formed to have another shape (for example, a substantially square shape, a substantially circular shape, a substantially semi-circular shape, and the like), without a departure from the scope of the present disclosure. The rear portion 108C of the frame 108 may be configured to mount the rear suspension 120 of the vehicle 100.

The frame 108 may further include the support portion 108D that may be located in proximity of the front portion 108A of the frame 108. The support portion 108D may be an extension that may extend substantially horizontally from the front portion 108A of the frame 108 and towards the middle portion 108B of the frame. The support portion 108D may be configured to support the battery unit 112 of the vehicle 100, as described in detail, for example, in FIG. 3.

The steering assembly 110 may control a direction of movement of the vehicle 100 and may include a plurality of components. The steering assembly 110 may be mounted at the front portion 108A of the frame 108. For example, the steering assembly 110 may include at least one of a handlebar or a steering wheel. The steering assembly 110 may further include an electric motor (provided for a power-assisted steering) that may be used by the rider or user to control a movement of the vehicle 100 in a manual mode or a semi-autonomous mode (or an assistive mode). In accordance with an embodiment, the movement or steering of the vehicle 100 may be automatically controlled when the vehicle 100 is in an autonomous or assistive mode. Examples of the steering assembly 110 may include, but are not limited to, an assembly, autonomous steering control, a power-assisted steering a vacuum/hydraulic-based steering assembly, an electro-hydraulic power-assisted system (EH-PAS), or a "steer-by-wire" system.

The battery unit 112 (i.e., a see-though view as shown in FIG. 1) may be a rechargeable battery unit that acts as a source of electric power for one or more electric circuits or loads (not shown) associated with the vehicle 100. For example, the battery unit 112 may be a source of electrical power for an electronic control unit, a sensor system, an electric powertrain system associated with the vehicle 100, or an electric motor of the vehicle 100. In some embodiments, the battery unit 112 may correspond to a battery pack, which may have a plurality of clusters of batteries, surrounded by a suitable coolant and a charge controller (not shown). Examples of the battery unit 112 may include, but are not limited to, a lead acid battery, a nickel cadmium battery, a nickel-metal hydride battery, a lithium-ion battery, and other rechargeable batteries. The battery unit 112 may be disposed on the support portion 108D of the frame 108. The battery unit 112 may be disposed between the pair of front wheels 104, as described in detail, for example, in FIG. 3.

The pedal unit 114 may be a portion of the vehicle 100 that the rider or user pushes with their foot to move the vehicle 100 in a forward direction. The pedal unit 114 may be mounted at the middle portion 108B of the frame and may function as a link between the rider's foot or shoe and a crank, enabling legs of the rider to rotate a bottom bracket spindle to move wheels of the vehicle 100 in the forward direction. The components of the pedal unit 114 may include a spindle that threads into the crank's end and a body that may be attached with a footrest. The footrest may rotate freely on bearings with respect to the spindle. For example, the pedal unit 114 may be fastened directly to a driven wheel of the pair of front wheels 104 of the vehicle 100 using cranks. As another example, the pedal unit 114 may be fastened directly to a driven wheel of the back wheel configuration 106 of the vehicle 100 using cranks.

The rear carrier 116 may be a vehicle structure that may be coupled to a rear portion (not shown) of the vehicle 100. The rear carrier 116 may be mounted in proximal proximity to the back wheel configuration 106 of the vehicle 100. By way of example, and not limitation, the rear carrier 116 may be mounted on a portion of the frame 108 that horizontally extends from the rear portion 108C towards the back wheel configuration 106. Alternatively, the rear carrier 116 may be mounted on a portion of the frame 108 that may be a rear end structure of the frame 108.

The rear carrier 116 may be a flatbed or container on wheels that may be used to transport items (such as goods, equipment, or heavy cargo) from one destination to another. The rear carrier 116 may be of several types (for example, a boom, a wheel lift, a self-loader, a quick pick, a flatbed, or a lift flatbed), usually based on a type or a size of the vehicle 100. The rear carrier 116 may be configured to support the cargo container 118.

The cargo container 118 may be a strong container configured for handling, storage, and transportation of cargo items. By way of example, and not limitation, the cargo container 118 may be a compact reusable steel box that can be used for intermodal shipments of the cargo items. Examples of the cargo container 118 may include, but are not limited to, a corrugated box, an open top container, a double door container, a refrigerated container, or an insulated container.

The rear suspension 120 may be a pneumatic or hydraulic device used to absorb and dampen shock subjected to the rear portion 108C of the frame 108. The rear suspension 120 may be mounted on the rear portion 108C of the frame 108 in proximity to the back wheel configuration 106. The rear suspension 120 may be mounted at an angle with the rear portion 108C of the frame 108. The rear suspension 120 absorbs the shock subjected to the rear portion 108C of the frame 108 and converts it into a different kind of energy, usually heat, which is then dissipated into the surrounding environment. By way of example, and not limitation, the rear suspension 120 may be configured to prevent the rear portion 108C of the frame 108, the rear carrier 116, and the cargo container 118 from physical damages. A cross section of the rear suspension 120 may have a substantially circular shape. Alternatively, the cross section of the rear suspension 120 may be formed to have another shape (for example, a substantially square shape, a substantially rectangular shape, a substantially semi-circular shape, and the like), without a departure from the scope of the present disclosure. As an example, the rear suspension 120 may be hydraulically actuated using hydraulic energy of fluid filled inside a cylinder (for example, the hydraulic lever 120A) associated with the rear suspension 120. As another example, the rear suspension 120 may be pneumatically actuated using a pneumatic energy of air surrounding a spring-based suspension.

The rear suspension 120 may include the hydraulic lever 120A that may support the rear portion 108C of the frame 108. The hydraulic lever 120A may be configured to balance a center of gravity of the rear portion 108C of the frame 108. By way of example, and not limitation, the hydraulic lever 120A of the rear suspension 120 may have a substantially cylindrical shape. Further, balancing the center of gravity of the rear portion 108C of the frame 108 may alleviate chances of tip over or overturning of the vehicle 100 around corners and turns, resulting in better maneuverability of the vehicle 100 in urban areas.

The rotational device 122 may include suitable logic, circuitry, interfaces, and/or code and may be coupled to wheels included in the back wheel configuration 106. The rotational device 122 may be configured to drive the wheels included in the back wheel configuration 106. The vehicle 100 may further include an electronic controller (not shown in FIG. 1) that may be communicatively coupled to the rotational device 122. The electronic controller may be a specialized electronic circuitry that may control distinct functions, such as, but not limited to, controlling actuation of the rotational device 122 to drive the wheels included in the back wheel configuration 106. In an embodiment, the electronic controller may be a microprocessor which may receive one or more control commands from the rider to control actuation of the rotational device 122. By way of example, and not limitation, the electronic controller may receive one or more commands from an automotive dashboard, an embedded device, a smartphone, a human-machine interface (HMI), a computer workstation, a handheld computer, a cellular/mobile phone, a portable consumer electronic (CE) device, a server, and other computing devices, to control actuation of the rotational device 122 to drive the wheels included in the back wheel configuration 106.

The electronic controller, in an operational state, may be configured to control actuation of the rotational device 122 to drive the wheels included in the back wheel configuration 106. Further, the electronic controller may detect revolution of the pedals included in the pedal unit 114 using a cadence sensor (included in the pedal unit 114). Based on the detection of the revolution of the pedals, the electronic controller may be configured to control the actuation of the rotational device 122. Additionally, or alternatively, the rider of the vehicle 100 may select a level of pedal assistance. Based on the detection of the revolution of the pedals, the electronic controller may control the actuation of the rotational device 122 based on the selected level of pedal assistance. For example, if the cadence sensor detects a slow revolution of the pedals (60-70 rpm) and the rider selects a high level of pedal assistance, then the electronic controller may control the actuation of the rotational device 122 to drive the wheels included in the back wheel configuration 106 at a higher speed (greater than 60-70 rpm). The wheels included in the back wheel configuration 106 driving at the higher speed may amplify the pedal power of the pedals making it easier for the rider to move the vehicle 100 in the forward direction. As another example, if the cadence sensor detects a fast revolution of the pedals (100-110 rpm) and the rider selects a low level of pedal assistance, then the electronic controller may control the actuation of the rotational device 122 to drive the wheels included in the back wheel configuration 106 at a lower speed (lower than 100-110 rpm). The wheels included in the back wheel configuration 106 driving at the lower speed reduces the pedal power of the pedals making it tougher for the rider to move the vehicle 100 in the forward direction.

FIG. 2A is a scenario diagram that illustrates a bottom view of a wheel arrangement of the vehicle of FIG. 1, in accordance with an embodiment of the disclosure. FIG. 2A is explained in conjunction with elements from FIG. 1. With reference to the FIG. 2A, there is shown an exemplary diagram that illustrates the bottom view 200A of the wheel arrangement 102 of the vehicle 100 that includes a one-wheel configuration 202. The bottom view 200A may include the pair of front wheels 104. The bottom view 200A may further include the back wheel configuration 106 having a rear wheel 206.

The back wheel configuration 106 may include the rear wheel 206 in the one-wheel configuration 202. In bottom view 200A, the one-wheel configuration 202 may include the pair of front wheels 104 and the rear wheel 206 in the back wheel configuration 106. It should be noted that the diagram of the bottom view 200A of the wheel arrangement 102 as shown in FIG. 2A is for exemplary purposes and should not be construed to limit the scope of the disclosure.

FIG. 2B is another scenario diagram that illustrates a bottom view of a wheel arrangement of the vehicle of FIG. 1, in accordance with an embodiment of the disclosure. FIG. 2B is explained in conjunction with elements from FIG. 1 and FIG. 2A. With reference to the FIG. 2B, there is shown an exemplary diagram that illustrates the bottom view 200B of the wheel arrangement 102 of the vehicle 100 that includes a two-wheel configuration 204. The bottom view 200B may include the pair of front wheels 104. The bottom view 200B may further include the back wheel configuration 106 having a pair of rear wheels 208.

The back wheel configuration 106 may include the pair of rear wheels 208 in the two-wheel configuration 204. In bottom view 200B, the two-wheel configuration 204 may include the pair of front wheels 104 and the pair of rear wheels 208 in the back wheel configuration 106. It should be noted that the diagram of the bottom view 200B of the wheel arrangement 102 as shown in FIG. 2B is for exemplary purposes and should not be construed to limit the scope of the disclosure.

Figure 3:
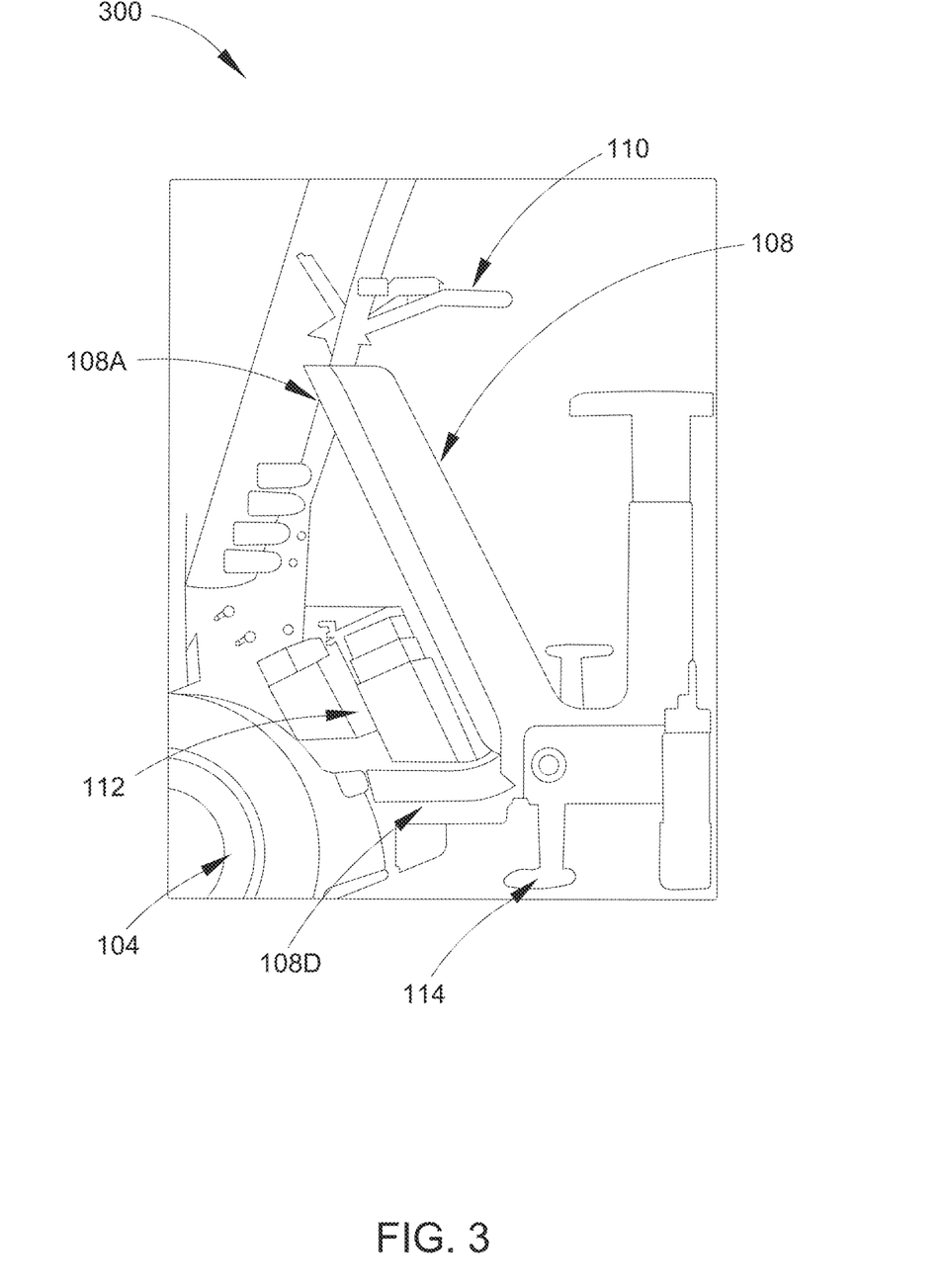
FIG. 3 is an exemplary diagram that illustrates a battery unit of the vehicle of FIG. 1, in accordance with an embodiment of the disclosure.

FIG. 3 is an exemplary diagram that illustrates a battery unit of the vehicle of FIG. 1, in accordance with an embodiment of the disclosure. FIG. 3 is explained in conjunction with elements from FIG. 1, FIG. 2A, and FIG. 2B. With reference to FIG. 3, there is shown an exemplary diagram 300 that illustrates the vehicle 100 (as shown in FIG. 1) having the battery unit 112. The vehicle 100 may include the battery unit 112 that may be disposed on the support portion 108D of the frame 108. The support portion 108D of the frame 108 may be an extension that extends from the front portion 108A of the frame 108, as described in detail, for example, in FIG. 1. The vehicle 100 may include the pair of front wheels 104 (as shown in FIG. 1 and FIG. 2). The battery unit 112 may be disposed between the pair of front wheels 104.

It should be noted that the battery unit 112 disposed between the pair of front wheels 104 as shown in FIG. 3 is for exemplary purposes and should not be construed to limit the scope of the disclosure.

Figure 4:
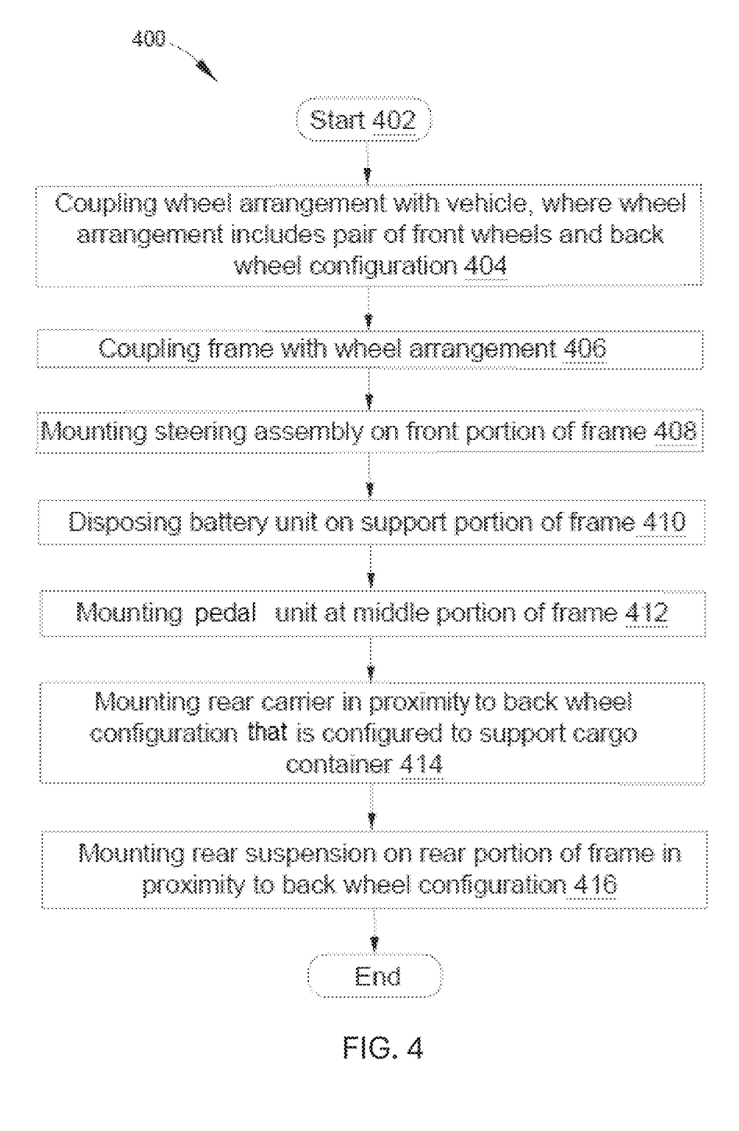
FIG. 4 is a flowchart that illustrates an exemplary method of assembling the vehicle of FIG. 1, in accordance with an embodiment of the disclosure.

FIG. 4 is a flowchart that illustrates an exemplary method of assembling the vehicle of FIG. 1, in accordance with an embodiment of the disclosure. FIG. 4 is explained in conjunction with elements from FIG. 1, FIG. 2A, FIG. 2B, and FIG. 3. With reference to FIG. 4, there is shown a flowchart 400, which may depict a method of assembling the vehicle 100. The method illustrated in the flowchart 400 may start at 402 and proceed to 404.

At 404, the wheel arrangement 102 may be coupled with the vehicle 100. The wheel arrangement 102 may include the pair of front wheels 104 and the back wheel configuration 106, as described in detail, for example, in FIG. 1, FIG. 2A, and FIG. 2B.

At 406, the frame 108 may be coupled with the wheel arrangement 102. The frame 108 may include the front portion 108A, the middle portion 108B, the rear portion 108C, and the support portion 108D, as described in detail, for example, in FIG. 1.

At 408, the steering assembly 110 may be mounted at the front portion 108A of the frame 108, as described in detail, for example, in FIG. 1.

At 410, the battery unit 112 may be disposed on the support portion 108D of the frame 108. Further, the battery unit 112 may be disposed between the pair of front wheels 104, as described in detail, for example, in FIG. 1 and FIG. 3.

At 412, the pedal unit 114 may be mounted at the middle portion 108B of the frame 108, as described in detail, for example, in FIG. 1.

At 414, the rear carrier 116 may be mounted in proximity to the back wheel configuration 106. The rear carrier 116 may be configured to support the cargo container 118, as described in detail, for example, in FIG. 1.

At 416, the rear suspension 120 may be mounted on the rear portion 108C of the frame 108 in proximity to the back wheel configuration 106, as described in detail, for example, in FIG. 1.

Although the flowchart 400 is illustrated as discrete operations, such as 402, 404, 406, 408, 410, 412, 414, and 416 the disclosure is not so limited. Accordingly, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also, to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A vehicle, comprising:
   a wheel arrangement having a pair of front wheels and a back wheel configuration;
   a frame coupled to the wheel arrangement;
   a steering assembly mounted on a front portion of the frame;
   a battery unit disposed on a support portion of the frame;
   a pedal unit mounted at a middle portion of the frame;
   a rear carrier that is proximal to the back wheel configuration and is configured to support a cargo container; and
   a rear suspension mounted on a rear portion of the frame in proximity to the back wheel configuration, wherein
      the front portion of the frame slopes upwardly from the middle portion of the frame and toward the steering assembly,
      the support portion of the frame extends substantially horizontally from the front portion of the frame and toward the middle portion of the frame, and
      the battery unit is disposed on the support portion of the frame directly beneath the steering assembly and between the pair of front wheels.

2. The vehicle according to claim 1, wherein the back wheel configuration corresponds to at least one of a one-wheel configuration or a two-wheel configuration.

3. The vehicle according to claim 2, wherein the one-wheel configuration includes a rear wheel, and the two-wheel configuration includes a pair of rear wheels.

4. The vehicle according to claim 1, wherein the rear suspension is pneumatically actuated using a pneumatic energy of air surrounding a spring-based suspension.

5. The vehicle according to claim 1, wherein
   wheels included in the back wheel configuration are diametrically smaller than the pair of front wheels, and
   the wheels included in the back wheel configuration are configured to provide a low center of gravity to the rear portion of the frame.

6. The vehicle according to claim 1, further comprising:
   a rotational device coupled to wheels included in the back wheel configuration; and
   an electronic controller communicatively coupled to the rotational device,
      wherein, in an operational state, the electronic controller is configured to control actuation of the rotational device to drive the wheels included in the back wheel configuration.

7. The vehicle according to claim 6, wherein the electronic controller is further configured to:
   detect revolution of pedals included in the pedal unit; and
   control the actuation of the rotational device based on the detection.

8. The vehicle according to claim 1, wherein the rear suspension includes a hydraulic lever that supports the rear portion of the frame.

9. The vehicle according to claim 8, wherein the hydraulic lever is configured to balance a center of gravity of the rear portion of the frame.

10. A vehicle, comprising:
a wheel arrangement having a pair of front wheels and a back wheel configuration;
a frame coupled to the wheel arrangement;
a steering assembly mounted on a front portion of the frame;
a battery unit disposed on a support portion of the frame;
a pedal unit mounted at a middle portion of the frame;
a rear carrier that is proximal to the back wheel configuration and is configured to support a cargo container;
a rear suspension mounted on a rear portion of the frame in proximity to the back wheel configuration, wherein
the front portion of the frame slopes upwardly from the middle portion of the frame and toward the steering assembly,
the support portion of the frame extends substantially horizontally from the front portion of the frame and toward the middle portion of the frame, and
the battery unit is disposed on the support portion of the frame directly beneath the steering assembly and between the pair of front wheels;
a rotational device coupled to at least one wheel included in the back wheel configuration; and
an electronic controller communicatively coupled to the rotational device,
wherein, in an operational state, the electronic controller is configured to control actuation of the rotational device to drive the at least one wheel included in the back wheel configuration.

11. The vehicle according to claim 10, wherein the back wheel configuration corresponds to at least one of a one-wheel configuration, or a two-wheel configuration.

12. The vehicle according to claim 11, wherein the one-wheel configuration includes a rear wheel, and the two-wheel configuration includes a pair of rear wheels.

13. The vehicle according to claim 10, wherein
the at least one wheel included in the back wheel configuration is diametrically smaller than the pair of front wheels, and
the at least one wheel included in the back wheel configuration is configured to provide a low center of gravity to the rear portion of the frame.

14. The vehicle according to claim 10, wherein the electronic controller is further configured to:
detect revolution of pedals included in the pedal unit; and
control the actuation of the rotational device based on the detection.

15. The vehicle according to claim 10, wherein,
the rear suspension includes a hydraulic lever that supports the rear portion of the frame, and
the hydraulic lever is configured to balance a center of gravity of the rear portion of the frame.

16. A method of assembling a vehicle, comprising:
coupling a wheel arrangement with the vehicle, wherein the wheel arrangement includes a pair of front wheels and a back wheel configuration;
coupling a frame with the wheel arrangement;
mounting a steering assembly on a front portion of the frame;
disposing a battery unit on a support portion of the frame;
mounting a pedal unit at a middle portion of the frame;
mounting a rear carrier in proximity to the back wheel configuration that is configured to support a cargo container; and
mounting a rear suspension on a rear portion of the frame in proximity to the back wheel configuration, wherein
the front portion of the frame slopes upwardly from the middle portion of the frame and toward the steering assembly,
the support portion of the frame extends substantially horizontally from the front portion of the frame and toward the middle portion of the frame, and
the battery unit is disposed on the support portion of the frame directly beneath the steering assembly and between the pair of front wheels.

17. The method according to claim 16, wherein the back wheel configuration corresponds to at least one of a one-wheel configuration or a two-wheel configuration.

18. The method according to claim 16, wherein
wheels included in the back wheel configuration are diametrically smaller than the pair of front wheels, and
the wheels included in the back wheel configuration are configured to provide a low center of gravity to the rear portion of the frame.

19. The method according to claim 16, further comprising:
coupling a rotational device to wheels included in the back wheel configuration; and
communicatively coupling an electronic controller to the rotational device,
wherein, in an operational state, the electronic controller is configured to control actuation of the rotational device to drive the wheels included in the back wheel configuration.

20. The method according to claim 19, further comprising:
detecting, by the electronic controller, revolution of pedals included in the pedal unit; and
controlling, by the electronic controller, the actuation of the rotational device based on the detection.

* * * * *